Figure 1:
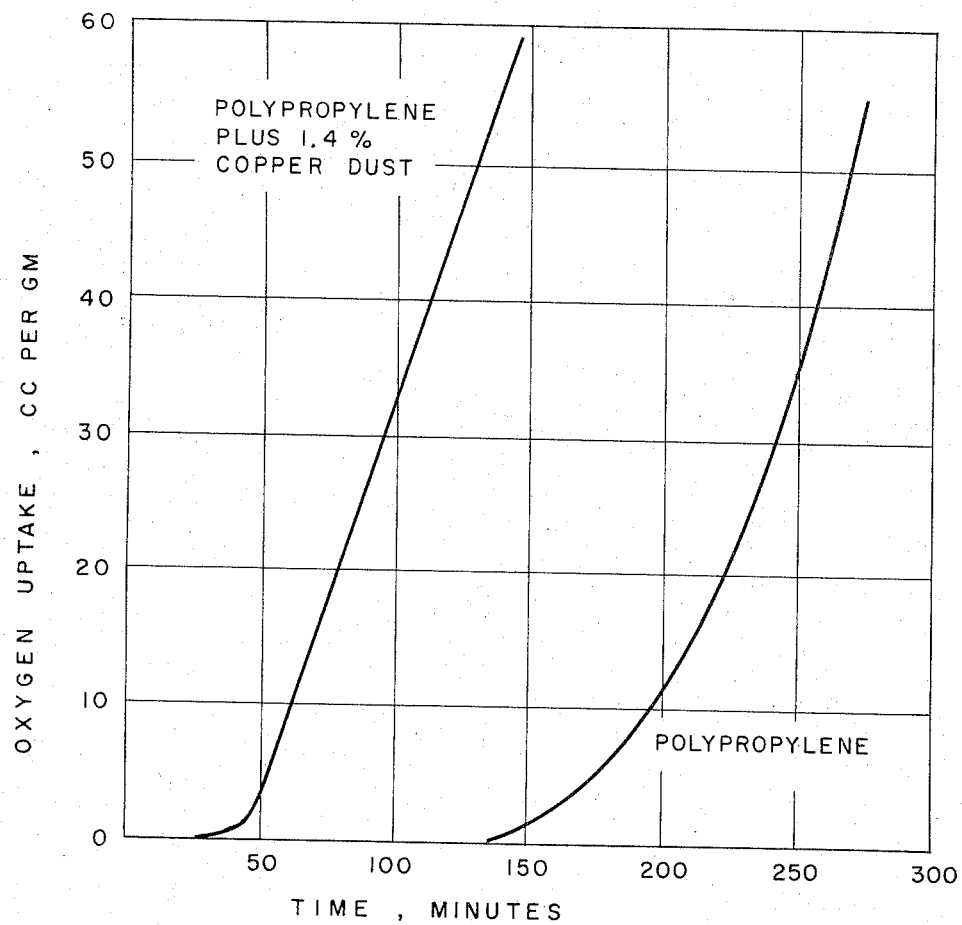

United States Patent Office 3,342,637
Patented Sept. 19, 1967

3,342,637
STABILIZED POLYPROPYLENE COATED
COPPER AND METHOD
Gunter S. Jaffe, Oakland, Calif., assignor to Shell Oil
Company, New York, N.Y., a corporation of Delaware
Filed Dec. 31, 1963, Ser. No. 334,758
6 Claims. (Cl. 117—232)

This invention relates to copper articles, such as wiring and cables, and to methods of coating copper articles with a stabilized polypropylene composition. More specifically, it relates to copper articles and to methods of coating copper articles with a composition comprising polypropylene and a tris(hydroxybenzyl)benzene which composition is not readily susceptible to degradation when in close association with copper.

It is well known that polyolefins, and in particular isotactic polypropylene, are subject to degradation by light, heat, oxygen, or combinations thereof, but various additives have been devised for inhibiting such degradation to a satisfactory degree. This degradation is promoted by residual metal traces of polymerization catalysts used in the low pressure method of preparing the poly-alpha-olefins. Very effective anti-oxidants to combat this degradation are those disclosed in U.S. Patent No. 3,026,264, to Rocklin et al.

In the presence of copper, however, it was found that most of the conventional stabilizing systems for polypropylene are entirely unsatisfactory. Polypropylene would make an excellent insulating material for copper wiring and cables because of its structural and dielectric properties. Accordingly, it is desirable to attain a polypropylene which is stabilized against degradation when in contact with copper.

The degradation of polypropylene is discussed in a paper, "Inhibition of Copper Catalyzed Oxidation of Polypropylene," by R. H. Hansen et al., presented at the St. Louis meeting of the American Chemical Society (Mar. 21–30, 1961), Division of Polymer Chemistry, a summary of which is printed on pages 190–195 of the reprints. The problem is summarized as follows:

Isotactic polyproylene is desirable as a dielectric and structural material because of its high softening point, negligible water absorption, relative hardness, toughness, insensitivity toward thermal embrittlement and stress cracking, and its low density and the accompanying excellent insulating properties. However, it has been found that copper presumably in an oxidized state, catalyzes the thermal oxidation of polypropylene. The reaction occurs so rapidly in the presence of copper that, even at 1.0% concentration, thermal antioxidants do not effectively inhibit the degradation. The induction period in oxygen at 140° C. for polypropylene stabilized by the addition of 0.5% by weight of 4,4'-thiobis-(3-methyl-6-tertiary-butyl-phenol) is decreased from about 400 hours to about 35 hours in the presence of copper. In this case, about 90% of the effectiveness of the antioxidant is lost if copper is present. In some antioxidant systems, more than 99% of the antioxidant effectiveness is destroyed by the presence of copper.

The authors solved the problem of copper-catalyzed polypropylene degradation by adding to the polypropylene oxamide or its derivatives.

Oxamide and is derivatives have some drawbacks as additives for polypropylene. Obtaining even distribution in the polymer is difficult since they are not readily soluble in the polymer. The amount required to provide protection is relatively high. In the desired amounts, oxidamide compounds have adverse effects on the electrical properties of the polypropylene. Nevertheless, oxamide has been considered an essential additive for commercial uses of polypropylene in applications where it is in contact with copper, such as in coating of electrical wiring.

It is an object of this invention to provide insulated or coated copper articles in which the insulator or coating comprises a solid polymer of propylene and having incorporated therein a single compound which stabilizes the polypropylene against degradation when in contact with said copper articles.

Other objects and advantages of the invention will be apparent from the following detailed description thereof.

The objects of this invention are accomplished by coating the copper articles with a composition comprising polypropylene and a trialkyl-tri(dialkyl-hydroxybenzyl)benzene.

Polypropylene suitable for use in this invention consists predominantly of crystallizable stereoregular, and particularly of isotactic, polypropylene. Following conventional terminology, reference to "stereoregular" polypropylene means, unless the context indicates otherwise, solid polypropylene having a high degree of stereoregularity reflected in at least 50% crystallinity, usually between 60 and 70% (as determined by X-ray diffraction analysis, infrared analysis or comparable methods), when solidified under conditions which favor crystallization. In general, this type of polypropylene contains at most only a very small proportion which is extractable in paraffinic hydrocarbons of up to gasoline boiling range. Typically, the proportion of highly crystallizable polypropylene which is extractable in boiling heptane or isoctane is less than 10% and usually less than 5%. The viscosity average molecular weight of such stereoregular polypropylene is usually at least about 40,000 and generally between 100,-000 and 1,600,000. The intrinsic viscosity, measured in decalin at 150° C., expressed in dl./g., may be as low as 0.8 or less and as high as 7 or more.

The trialkyl - tri(dialkyl - hydroxybenzyl)benzenes are sterically-hindered phenols, disclosed in U.S. Patent No. 3,026,264 to Rocklin et al. It is surprising to find that the phenols disclosed therein were far superior to other phenols in stabilizing polypropylene against degradation when in contact with copper articles.

Rocklin et al. were concerned with stabilizing poly-alpha-olefins such as polyethylene and polypropylene, which contained traces of residual metals present as residues of catalysts, such as titanium, aluminum, vanadium and zirconium, used in the low pressure polymerization method. While a copper catalyst could conceivably be employed in the polymerization of polyethylene, such catalysts are avoided in polymerizing propylene. The use of copper catalyst in the latter case would result in immediate disaster and degradation of the polypropylene. Accordingly, Rocklin et al. were not cognizant that their phenols in sufficient concentrations would stabilize polypropylene against degradation when in contact with copper. Further, there is a drastic difference between problems of stabilizing polypropylene against degradation when in the presence of traces of residual metals resulting from polymerization catalysts, and that of stabilizing it against degradation when in continuous contact with copper. The presence of copper in polypropylene presents unique stability problems as illustrated by the Hansen et al. paper.

The coating compositions of this invention are prepared by adding to stereoregular polypropylene a phenol generally described by the formula

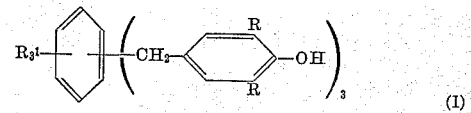

(1)

wherein each R and $R^1$ is an alkyl radical, preferably having up to eight carbon atoms. Since compounds having sterically-hindered hydroxyl groups are most satisfactory, it is preferred that at least one, and most preferably both, of the alkyl substituents R have from 3–8 carbon atoms and be branched on the alpha carbon atom.

Representative compounds of this formula include 1,2,4-trimethyl-3,5,6-tri(3-methyl-5-isopropyl-4-hydroxybenzyl)benzene;
1,2,5-triethyl-3,4,6-tri(3,5-diisopropyl-4-hydroxybenzyl)benzene;
1,2,4-tripropyl-3,5,6-tri(3-ethyl-5-tert-butyl-4-hydroxybenzyl)benzene;
1,2,4-trioctyl-2,3,5-tri(3-hexyl-5-tert-amyl-4-hydroxybenzyl)benzene; and the like.

Also typical are compounds wherein the R' substituents differ from one another, such as 1,2-dimethyl-5-ethyl-3,4,6-tri(3-amyl-5-tert-butyl-4-hydroxybenzyl)benzene and
1-methyl-2,4-dibutyl-3,5,6-tri(3,5-di-tert-hexyl-4-hydroxybenzyl)benzene.

In general, it has been found that the symmetrical hexasubstituted benzenes are the most effective stabilizers as well as being the easier compounds to prepare. These compounds are the 1,3,5-trialkyl-2,4,6-tri(3,5-dialkyl-4-hydroxybenzyl)benzenes having the formula

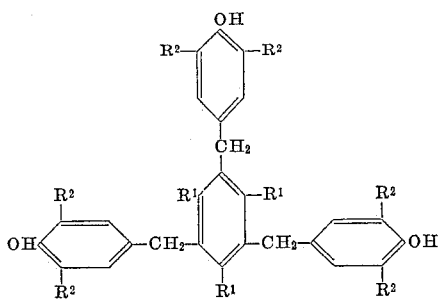

wherein $R^1$ is an alkyl group of from 1 to 5 carbon atoms and $R^2$ is an alkyl group branched on the alpha carbon atom selected from isopropyl, tertiary butyl, tertiary amyl, tertiary hexyl, tertiary heptyl, and tertiary octyl. The preferred compounds are those having three 3,5-di-tert-butyl-4-hydroxybenzyl radicals and the most preferred compound is 1,3,5-trimethyl-2,4,6-tri(3,5-di-tert-butyl-4-hydroxybenzyl)benzene. For simplicity this compound is hereinafter referred to as phenol "M." Preparation of these compounds is given in the above mentioned patent to Rocklin et al.

The pure products are white or light-colored crystalline solids at room temperature and usually have relatively high melting and boiling points. They are insoluble in water but soluble in hydrocarbon and polar organic solvents and generally miscible with organic solid substrates. They have superior thermal stabilizing properties and relatively low volatility and are, therefore, particularly effective as antioxidants for materials which during preparation or use are subjected to elevated temperatures.

Polypropylene for use in this invention is stereoregular, preferably isotactic, polypropylene prepared at low temperatures and pressures in the presence of certain catalyst compositions which are commonly referred to as "Ziegler-type" catalysts, "low pressure catalysts," or "coordination catalysts." It is characterized in that it is highly crystalline, has a high melting point, i.e., in the order of about 170° C. and improved tensile strength. Catalysts which are particularly suitable for production of highly crystalline polypropylene, and their uses, are described in U.S. Patent 2,971,925 to Winkler et al.

This invention can best be appreciated by a consideration of the degradation process of polypropylene when in contact with copper.

The degradation of polypropylene from a high molecular weight, tough and flexible plastic to a brittle and hard powdery substance of decreased molecular weight is a well-known phenomenon. This degradation process follows a complex mechanism which may be delayed by the addition of one or more chemical compounds referred to as stabilizers. However, while some chemicals can prolong the useful life of polypropylene, copper tends to catalyze the degradation process and thus shorten its useful life. FIGURE 1 shows that the thermal oxidation of polypropylene becomes catalytic when copper dust has been milled into the polymer. In the absence of copper, the thermal oxidation of polypropylene proceeds normally and autocatalytically. In the presence of copper, this autocatalytic period is reduced markedly and the oxidation reaction rapidly attains a catalytic, constant, and non-accelerating rate. FIGURE 1 shows that the induction period is shorter in the presence of copper than is observed in the absence of copper.

Figure 2:
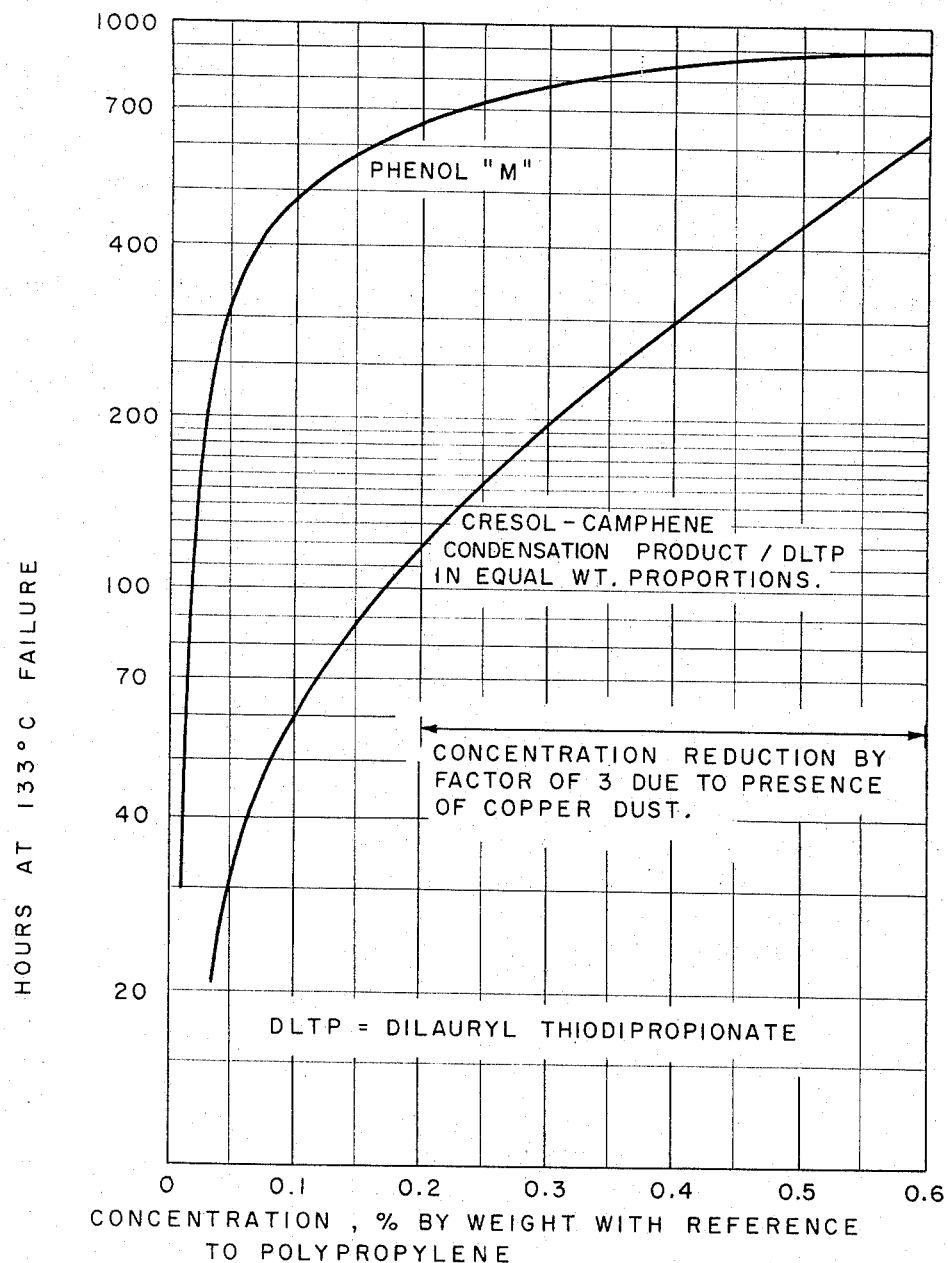

The catalytic effect of copper on the oxidative degradation of polypropylene is also observed when antioxidants art present. Experimental data has indicated that copper in oxidized form, such as cuprous oxide and copper stearate, rather than the metal itself, is responsible for the catalysis of the degradation of polypropylene. Oxygen uptake studies of uninhibited polypropylene in the presence and absence of 1.4% copper dust indicate that the induction periods are generally shortened by a factor of three when the copper dust is present, as illustrated by FIGURE 1. Stated another way, the degradation reaction of uninhibited polypropylene in the presence of 1.4% copper dust occurs at triple the rate as compared to uninhibited polyproylene in the absence of copper. Thus, when an antioxidant is added to polypropylene which is in the presence of 1.4% copper dust it must interfere with the degradation reaction at triple the rate in order to achieve the same effectiveness had copper not been present. Stated in terms of the antioxidant, the presence of 1.4% copper dust reduces the effective concentration of the antioxidant by a factor of three. However, a reduction in the effective concentration of the antioxidant by a factor of three may result in a reduction in the loss of relative effectiveness thereof by as much as 90%. The effectiveness of an antioxidant many be expressed as that period of time for which the antioxidant affords protection to polypropylene, i.e., the period of time which elapses from the formation of the composition comprising the antioxidant, copper dust, and polypropylene, to that time when the composition becomes brittle and is no longer useful. This relationship of these two variables, concentration of a given antioxidant and protection time afforded polypropylene by the given antioxidant may be graphically illustrated. FIGURE 2 is a plot of the above-described graphical illustration for two antioxidant systems, (1) phenol M and (2) a synergistic mixture consisting of equal proportions by weight of (a) dilauryl beta-thiodipropionate and (b) the condensation product of cresol and camphene commonly designated as oxycresyl camphene.

In FIGURE 2 the log of the protection time of polypropylene is plotted versus concentration of the antioxidant. Generally, all phenols have the same characteristically shaped curve as that of phenol M shown in FIGURE 2 under like conditions, while synergistic mixtures of a phenol and a sulfide have the same characteristically shaped curve as the synergistic mixture shown in FIGURE 2. Phenols generally afford less protection to polypropylene than the synergistic mixtures, and accordingly their curves generally lie below the curves of the synergistic mixtures. Consequently, even though the percent effectiveness loss due to the presence of copper in the polypropylene may be relatively slight in the case of a given phenol, the phenol may, nevertheless, be ineffective as a stabilizer because it generally affords protection to the polypropylene for only a small period of time. For this reason, it was believed necessary to formulate synergistic mixtures such as that referred to in FIGURE 2, in an effort to increase the protection to the polypropylene. As illustrated in FIGURE 2, a synergistic mixture, because of its characteristically shaped curve, forfeits a large amount of the protection afforded the polypropylene when copper is present, e.g., as much as 80% or more. However, even with a loss of 80%, the synergistic mixture affords greater protection to polypropylene when copper is present than most phenols which may lose only 40%. The reason for this is that while the difference between the protection afforded by the phenol in the presence and absence of copper is slight, the actual protection afforded the polyproylene is both incidences is likewise slight.

It was therefore, surprising and unexpected to find that phenol M afforded high protection to polypropylene both in the presence and absence of copper. FIGURE 2 shows the characteristic concentration/protection curve for phenol M, that is a sharp initial slope, an abrupt bend, and then a gradual slope approaching a maximum. The phenol M curve, however, differs from the curves of other phenolic compounds in that the bend or change in slope of the characteristic curve occurs at a high protection point on the ordinate axis. Thus, it is possible by selecting a predetermined concentration of phenol M to maintain a high protection of polypropylene either in the presence or absence of copper, i.e., by selecting a concentration of phenol M so that a reduction thereof by a factor of three falls on the curve at a point where the slope is gradual. Accordingly, referring to FIGURE 2, at a concentration of 0.6%, phenol M protects the polypropylene for about 900 hours, while the synergistic mixture protects the polypropylene for about 650 hours. With copper present the protection afforded is 650 hours and 120 hours, respectively. The phenol M lost about 30% of its protection whereas the synergistic mixture lost more than 80%.

More significant than the relative loss of protection is the protection in terms of time afforded polypropylene in the presence of copper. However, long time protection of polypropylene in the presence of copper must be accomplished at relatively low concentrations of the stabilizer since at high levels of concentration one encounters (1) adverse effects on the electrical properties of polypropylene, (2) difficulty of obtaining even distribution of the stabilizer in the polypropylene, and (3) the expense of the stabilizer.

The superior stabilizing qualities of phenol M can readily be appreciated from FIGURE 2 and the examples which follow. It is the characteristic concentration/protection curve of phenol M coupled with the fact that the slope change or bend of the curve occurs at a high protection value for polypropylene that renders it so effective in stabilizing polypropylene in the presence of copper.

In stabilizing polypropylene against the effects of copper, the most obvious method is the addition of a suitable chelating agent or metal deactivator to minimize or stop the activity of the copper ion as a degradation catalyst. The most effective such metal deactivators known presently is the family of oxamides. The drawbacks of the oxamides have been discussed above.

Another method of stabilizing polypropylene against the effects of copper is in the use of synergistic combinations of prior art phenols and thiodiesters. As illustrated by FIGURE 2, the synergistic combinations exhibit a very gradual increase in protection with increasing concentration thereof.

FIGURE 2 also illustrates the protection of the polypropylene with phenol M. Phenol M shows a sharp increase in protection up to a concentration of about 0.1% and then a gradual increase in protection as more phenol M is added, until at some concentration beyond 0.75% a plateau is reached.

While it is not necessary, it will be understood that the compositions for use in this invention may contain from 0.01% to 2.0% by weight with reference to the polypropylene of a metal deactivator, such as oxanilide, in addition to the phenol. The effect of the metal deactivator in the composition is to reduce the amount of available copper catalyst and thus increase the effective concentration of the phenol.

The polypropylene coatings or insulators of this invention find use in general for coating or insulating copper articles. Of particular interest is the insulating of copper wiring and cables with the polypropylene compositions for conduction of electricity. It has been determined that polypropylene compositions to be useful commercially in insulating copper wiring and cables must have a minimum life expectancy of forty years at 65° C. From an "Arrhenius Plot" this translates to approximately 4 days at 140° C. in the presence of 1.4% copper dust. This standard can be realized by incorporating into polypropylene phenol M without the aid of oxanilide or other special metal deactivators.

Further, since the 1,3,5-trialkyl-2,4,6-tri(3,5-di-alkyl-4-hydroxybenzyl)benzenes are resistant to discoloration in polypropylene compositions, the polypropylene insulating compositions may be colored in order to identify or distinguish electrical wiring and components.

The compositions used in this invention may be prepared by any of the mastication processes. A satisfactory method for mixing the antioxidant with the isotactic polypropylene made by the low pressure process is to add a solution of the antioxidant to isotactic polypropylene powder obtained by said process and then removing the solvent by evaporation. Another method is to add the antioxidant to the isotactic polypropylene and mill the composition at about 190° C. for several minutes to obtain a homogeneous blend.

The compositions useful in this invention may also contain other materials such as pigments, dyes, fillers, etc.

The examples which follow illustrate my invention. It will be understood, however, that the invention is in no way limited thereto.

Examples 1 to 3 relate to experimental data which illustrates the superior and unexpected ability of the phenols of this invention to stabilize isotactic polypropylene compositions when in contact with copper. Examples 4 and 5 are drawn to methods of insulating and coating copper wire and articles, respectively.

The examples employ 1,3,5-trimethyl-2,4,6-tri(3,5-di-tert-butyl-4-hydroxybenzyl)benzene, phenol M as the antioxidant since it is found to be the most efficient in stabilizing isotactic polypropylene compositions in contact with copper. It is understood however, that any of the phenols encompassed by Formula 1 may be similarly used.

The concentration of the phenol in the compositions may vary depending upon the properties of the polypropylene substrate and the life expectancy required of the coating. Generally, the concentration of the phenol is from 0.01% to 2% by weight with reference to the polypropylene and preferably 0.15% to 0.8%, but the concentration may vary from 0.01% to 10% or even higher.

In the examples to follow commercially available polypropylenes are designated by a letter, e.g., A, and their intrinsic viscosities, measured in decalin at 150° C., are expressed in deciliter per gram, dl./g.

EXAMPLE I

An isotactic polypropylene was milled four minutes at 190° C. with various amounts of anti-oxidants as indicated in Table I, then 1.4% by weight of copper dust was incorporated into the composition and milled for an additional minute to form a homogeneous blend in each case. The resulting compositions were pressed into 11 to 12 mil plates and kept at a predetermined temperature in an air circulating oven. The results of these tests are given in Table I. Embrittlement constitutes failure.

TABLE I

1. Experimental substrate

| Antioxidant | Oven Time to Failure, Days at— | |
|---|---|---|
| | 150° C. | 133° C. |
| A) Phenol M alone: | | |
| 0.15% phenol M | 6 | 49 |
| 0.25% phenol M | 10 | 81 |
| (B) Phenol M plus 0.5% Oxanilide: | | |
| 0.15% phenol M | 4 | 51 |
| 0.25% phenol M | 13 | 81 |

2. Commercial polypropylenes for general use containing manufacturer's stabilizers but not containing phenol M

| Polypropylene Sample | Intrinsic Viscosity, dl./g. | Oven Time to Failure, Days at— | |
|---|---|---|---|
| | | 150° C. | 133° C. |
| A | 2.1 | 1 | 7 |
| B | 2.1 | ¼ | 9 |
| C | 2.5 | ¼ | ¾ |
| D | 2.5 | ¼ | ¾ |

EXAMPLE II 11 to 12 mil plates were prepared by the procedure of Example I except that 0.7% by weight of copper dust was incorporated into the composition instead of 1.4%. The plates were kept at a 150° C. in an air circulating oven. The results of these tests are given in Table II.

TABLE II

| Experimental Substrate (phenol M) | Oven Time to Failure, Days at 150° C. | |
|---|---|---|
| | Phenol M | Phenol M+0.5% Oxanilide |
| 0.5% | 19 | 22 |
| 0.35% | 15 | 18 |
| 0.25% | 10 | 13 |
| 0.15% | 7 | 8 |

EXAMPLE III 10 mil copper wire is degreased in toluene-acetone mixture and etched in sulfate-persulfate in aqueous ammonia. Three strands are embedded in a 1″ x 2″ x 50 mil compression molded plate. The end of the plate is cut with scissors to expose all three strand ends of wire. The plate is then hung in an air circulating oven at 150° C. and observed. The results are given in Table III. Strong yellow-brown to brown discoloration, crazing and embrittlement at or near the wire strands constitutes failure. The polypropylene plates are prepared from commercially available polypropylene containing stabilizers for general use.

TABLE III

| Polypropylene Sample | Intrinsic Viscosity, dl./g. | Comments | Oven Time to Failure, Days |
|---|---|---|---|
| A | 1.6 | | 1 |
| B | 1.3 | | 1 |
| C | 1.5 | | 1 |
| D | 2.5 | | 1 |
| E | 2.1 | | 2 |
| F | 2.3 | Substrate containing 0.35% phenol M. | 14 |
| G | 1.2 | Substrate containing 0.30% phenol M. | 16 |
| H | 1.9 | Substrate containing 0.45% phenol M. | 17 |
| I | 1.6 | Entire plate brittle in 6½ hours | <1 |
| J | 1.3 | Entire plate brittle in 6½ hours | <1 |

The effectiveness of 1,3,5-trimethyl-2,4,6-tri(3,5-di-tert-butyl-4-hydroxybenzyl)benzene in stabilizing polypropylene against degradation when in contact with copper is clearly illustrated by the foregoing examples. From an Arrhenius plot of the reciprocal of the temperature in degrees absolute versus the log of the time of protection afforded the polypropylene, one may extrapolate four days protection at 140° C. to guarantee safety protection of 40 years at 65° C.

In stabilizing a given substrate of polypropylene against the effects of copper to obtain a predetermined life expectancy thereof at a specified temperature, it is advisable to independently determine the concentration/protection relationship of the substrate when in the presence of copper. Referring to FIGURE 2, while phenol M will give the same characteristic concentration/protection curve for all substrates, the initial steepness thereof is somewhat dependent upon the acidity, catalyst residue and general purity of the substrate.

EXAMPLE IV

Insulation of copper wiring

Polypropylene is milled at 190° C. for four minutes with 0.35% by weight with reference to the polypropylene of 1,3,5-trimethyl-2,4,6-tri(3,5-di-tert-butyl-4-hydroxybenzyl)benzene to form a homogeneous blend. The composition is then extruded on to copper wire using any conventional extruding apparatus, such as that described in U.S. Patent No. 2,848,739 to Henning. The concentration of the phenol may be varied depending upon (1) the desired life expectancy of the insulation and (2) the quality of the polypropylene substrate.

EXAMPLE V

Coating of copper articles

Copper articles, such as a copper sheet, are coated with the polypropylene-phenol composition prepared in Example IV by pressing the composition on to the articles. Again, the concentration of the phenol may be varied depending upon (1) the desired life expectancy of the coating and (2) the quality of the polypropylene substrate.

I claim as my invention:

1. A method of coating copper articles which comprises coating said copper articles with a composition comprising isotactic polypropylene and from about 0.01% to about 10% by weight with reference to the polypropylene of a sterically-hindered phenol of the formula

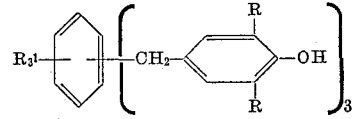

wherein R and R¹ are alkyl radicals of from 3 to 10 carbon atoms, characterized in that at least one of the R's attached adjacent to the hydroxy groups is a branched-chain alkyl radical branched on the alpha carbon atom.

2. A method according to claim 1 wherein the copper articles are copper wiring and cables.

3. A method according to claim 2 wherein the phenol is 1,3,5 - trimethyl-2,4,6-tri(3,5-di-tert-butyl-4-hydroxybenzyl)benzene.

4. A method according to claim 3 wherein the composition contains from about 0.01% to about 2% by weight with reference to the polypropylene of oxanilide.

5. A copper article coated with a film consisting of a composition stabilized against degradation resulting from the presence of copper, said composition comprising isotactic polypropylene and a stabilizing amount of a sterically-hindered phenol of the formula

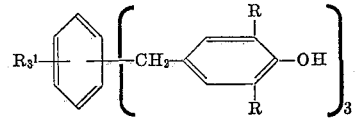

wherein R and R¹ are alkyl radicals of from 3 to 10 carbon atoms, characterized in that at least one of the R's attached adjacent to the hydroxy groups is a branched-chain alkyl radical branched on the alpha carbon atom.

6. A copper article according to claim 5 wherein the sterically-hindered phenol is 1,3,5-trimethyl-2,4,6-tri(3,5-di-tert-butyl-4-hydroxybenzyl)benzene present in an amount varying from about 0.01% to about 10% by weight with reference to the polypropylene.

References Cited

UNITED STATES PATENTS 3,110,696  11/1963  Dexter _____ 260—45.8
3,296,188  1/1967  Leu _____ 260—45.95

ALFRED L. LEAVITT, *Primary Examiner.*

WILLIAM L. JARVIS, *Assistant Examiner.*